(12) United States Patent
Koudar et al.

(10) Patent No.: US 12,123,980 B2
(45) Date of Patent: Oct. 22, 2024

(54) LIDAR SYSTEM WITH DYNAMIC RESOLUTION

(71) Applicant: SEMICONDUCTOR COMPONENTS INDUSTRIES, LLC, Phoenix, AZ (US)

(72) Inventors: Ivan Koudar, Modrice (CZ); Dariusz Piotr Palubiak, Cork (IE); Steven John Buckley, Henlow (GB); Salvatore Gnecchi, Cork (IE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 962 days.

(21) Appl. No.: 16/948,380

(22) Filed: Sep. 16, 2020

(65) Prior Publication Data

US 2021/0223372 A1 Jul. 22, 2021

Related U.S. Application Data (60) Provisional application No. 62/963,655, filed on Jan. 21, 2020.

(51) Int. Cl.
*G01S 7/4865* (2020.01)
*G01S 7/481* (2006.01)
*G01S 17/10* (2020.01)

(52) U.S. Cl.
CPC .......... *G01S 7/4865* (2013.01); *G01S 7/4814* (2013.01); *G01S 7/4816* (2013.01); *G01S 17/10* (2013.01)

(58) Field of Classification Search
None
See application file for complete search history.

(56) References Cited

U.S. PATENT DOCUMENTS

| | | | |
|---|---|---|---|
| 2018/0164415 A1* | 6/2018 | Buckley | G01S 7/4861 |
| 2018/0209846 A1 | 7/2018 | Mandai et al. | |
| 2019/0056497 A1* | 2/2019 | Pacala | G01S 7/4816 |
| 2019/0277952 A1* | 9/2019 | Beuschel | G01S 17/931 |
| 2020/0116838 A1* | 4/2020 | Erdogan | G01S 7/4816 |
| 2020/0225333 A1* | 7/2020 | Birnbacher | G01S 17/08 |
| 2022/0171037 A1* | 6/2022 | Barry | G01S 7/4816 |

OTHER PUBLICATIONS

Zhang et al. "A 30-frames/s, 252 × 144 SPAD Flash LiDAR With 1728 Dual-Clock 48.8-ps TDCs, and Pixel-Wise Integrated Histogramming." IEEE Journal of Solid-State Circuits: Dec. 2018.

Vornicu et al. "Compact Real-Time Inter-Frame Histogram Builder for 15-Bits High-Speed ToF-Imagers Based on Single-Photon Detection." IEEE Sensors Journal, vol. 19, No. 6, Mar. 15, 2019.

* cited by examiner

*Primary Examiner* — Luke D Ratcliffe
(74) *Attorney, Agent, or Firm* — Treyz Law Group, P.C.; Joseph F. Guihan (57) ABSTRACT

An imaging system may include a silicon photomultiplier with single-photon avalanche diodes (SPADs). The imaging system may be a LIDAR imaging system with LIDAR processing circuitry. To reduce memory requirements in the LIDAR processing circuitry, a dynamic resolution storage scheme may be used. The LIDAR processing circuitry may include autonomous dynamic resolution circuitry that receives input from a time-to-digital converter (TDC). The autonomous dynamic resolution circuitry may include a plurality of memory banks having different resolutions. Based on the magnitude of the input from the TDC, an appropriate memory bank may be selected. In parallel, an address encoder may select a memory bin based on the input from the TDC.

20 Claims, 10 Drawing Sheets

| BANK \ TDC BIT | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | 0 | 1 | 2 | 3 | 4 | 5 | 6 | 7 | 8 | 0 | 0 | 0 | 0 | 0 |
| 1 | X | X | X | X | X | X | X | X | X | 1 | 0 | 0 | 0 | 0 |
| 2 | X | X | X | X | X | X | X | X | X | X | 1 | 0 | 0 | 0 |
| 3 | D | D | X | X | X | X | X | X | X | X | X | 1 | 0 | 0 |
| 4 | D | D | D | X | X | X | X | X | X | X | X | X | 1 | 0 |
| 5 | D | D | D | D | X | X | X | X | X | X | X | X | X | 1 |

LIDAR SYSTEM WITH DYNAMIC RESOLUTION

This application claims the benefit of provisional patent application No. 62/963,655, filed Jan. 21, 2020, which is hereby incorporated by reference herein in its entirety.

BACKGROUND

This relates generally to imaging systems, and more specifically, to light detection and ranging (LIDAR) based imaging systems.

Conventional LIDAR imaging systems illuminate a target with light (typically a coherent laser pulse). The LIDAR imaging system measures the return time of reflections off the target to determine a distance to the target and measures light intensity to generate three-dimensional images of a scene.

LIDAR imaging systems may have design requirements such as low uncertainty (e.g., less than 0.1% uncertainty) and ranging over a wide range of distances (e.g., between 3 meters and 300 meters). Conventional LIDAR imaging systems with these requirements need a very high amount of memory.

It would therefore be desirable to provide improved LIDAR imaging systems.

DETAILED DESCRIPTION

Embodiments of the present invention relate to imaging systems that include single-photon avalanche diodes (SPADs).

Some imaging systems include image sensors that sense light by converting impinging photons into electrons or holes that are integrated (collected) in pixel photodiodes within the sensor array. After completion of an integration cycle, collected charge is converted into a voltage, which is supplied to the output terminals of the sensor. In complementary metal-oxide semiconductor (CMOS) image sensors, the charge to voltage conversion is accomplished directly in the pixels themselves, and the analog pixel voltage is transferred to the output terminals through various pixel addressing and scanning schemes. The analog pixel voltage can also be later converted on-chip to a digital equivalent and processed in various ways in the digital domain.

In single-photon avalanche diode (SPAD) devices (such as the ones described in connection with FIGS. 1-4), on the other hand, the photon detection principle is different. The light sensing diode is biased above its breakdown point, and when an incident photon generates an electron or hole, this carrier initiates an avalanche breakdown with additional carriers being generated. The avalanche multiplication may produce a current signal that can be easily detected by readout circuitry associated with the SPAD. The avalanche process can be stopped (or quenched) by lowering the diode bias below its breakdown point. Each SPAD may therefore include a passive and/or active quenching circuit for halting the avalanche.

This concept can be used in two ways. First, the arriving photons may simply be counted (e.g., in low light level applications). Second, the SPAD pixels may be used to measure photon time-of-flight (ToF) from a synchronized light source to a scene object point and back to the sensor, which can be used to obtain a 3-dimensional image of the scene.

Figure 1:
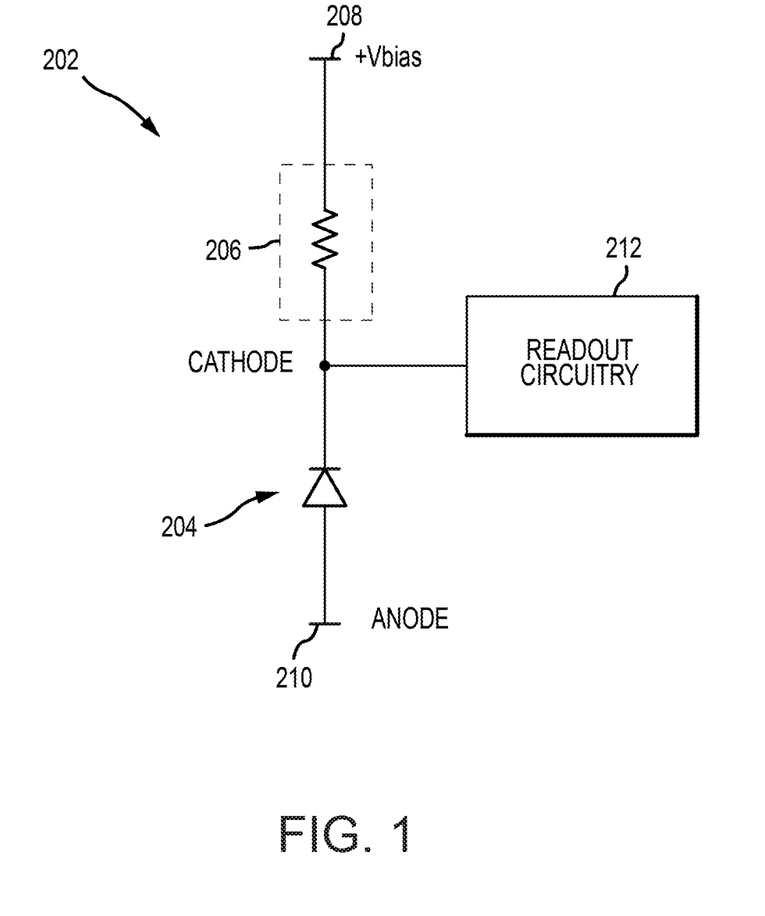
FIG. 1 is a circuit diagram showing an illustrative single-photon avalanche diode pixel in accordance with an embodiment.

FIG. 1 is a circuit diagram of an illustrative SPAD device 202. As shown in FIG. 1, SPAD device 202 includes a SPAD 204 that is coupled in series with quenching circuitry 206 between a first supply voltage terminal 210 (e.g., a ground power supply voltage terminal) and a second supply voltage terminal 208 (e.g., a positive power supply voltage terminal). In particular, SPAD device 202 includes a SPAD 204 having an anode terminal connected to power supply voltage terminal 210 and a cathode terminal connected directly to quenching circuitry 206. SPAD device 202 that includes SPAD 204 connected in series with a quenching resistor 206 is sometimes referred to collectively as a photo-triggered unit or "microcell." During operation of SPAD device 202, supply voltage terminals 208 and 210 may be used to bias SPAD 204 to a voltage that is higher than the breakdown voltage (e.g., bias voltage Vbias is applied to terminal 208). Breakdown voltage is the largest reverse voltage that can be applied to SPAD 204 without causing an exponential increase in the leakage current in the diode. When SPAD 204 is reverse biased above the breakdown voltage in this manner, absorption of a single-photon can trigger a short-duration but relatively large avalanche current through impact ionization.

Quenching circuitry 206 (sometimes referred to as quenching element 206) may be used to lower the bias voltage of SPAD 204 below the level of the breakdown voltage. Lowering the bias voltage of SPAD 204 below the breakdown voltage stops the avalanche process and corresponding avalanche current. There are numerous ways to form quenching circuitry 206. Quenching circuitry 206 may be passive quenching circuitry or active quenching circuitry. Passive quenching circuitry may, without external control or monitoring, automatically quench the avalanche current once initiated. For example, FIG. 1 shows an example where a resistor component is used to form quenching circuitry 206. This is an example of passive quenching circuitry.

This example of passive quenching circuitry is merely illustrative. Active quenching circuitry may also be used in SPAD device 202. Active quenching circuitry may reduce the time it takes for SPAD device 202 to be reset. This may allow SPAD device 202 to detect incident light at a faster rate than when passive quenching circuitry is used, improving the dynamic range of the SPAD device. Active quenching circuitry may modulate the SPAD quench resistance. For example, before a photon is detected, quench resistance is set high and then once a photon is detected and the avalanche is quenched, quench resistance is minimized to reduce recovery time.

SPAD device 202 may also include readout circuitry 212. There are numerous ways to form readout circuitry 212 to obtain information from SPAD device 202. Readout circuitry 212 may include a pulse counting circuit that counts arriving photons. Alternatively or in addition, readout circuitry 212 may include time-of-flight circuitry that is used to measure photon time-of-flight (ToF). The photon time-of-flight information may be used to perform depth sensing. In one example, photons may be counted by an analog counter to form the light intensity signal as a corresponding pixel voltage. The ToF signal may be obtained by also converting the time of photon flight to a voltage. The example of an analog pulse counting circuit being included in readout circuitry 212 is merely illustrative. If desired, readout circuitry 212 may include digital pulse counting circuits. Readout circuitry 212 may also include amplification circuitry if desired.

The example in FIG. 1 of readout circuitry 212 being coupled to a node between diode 204 and quenching circuitry 206 is merely illustrative. Readout circuitry 212 may be coupled to terminal 208 or any desired portion of the SPAD device. In some cases, quenching circuitry 206 may be considered integral with readout circuitry 212.

Because SPAD devices can detect a single incident photon, the SPAD devices are effective at imaging scenes with low light levels. Each SPAD may detect the number of photons that are received within a given period of time (e.g., using readout circuitry that includes a counting circuit). However, as discussed above, each time a photon is received and an avalanche current initiated, the SPAD device must be quenched and reset before being ready to detect another photon. As incident light levels increase, the reset time becomes limiting to the dynamic range of the SPAD device (e.g., once incident light levels exceed a given level, the SPAD device is triggered immediately upon being reset).

Figure 2:
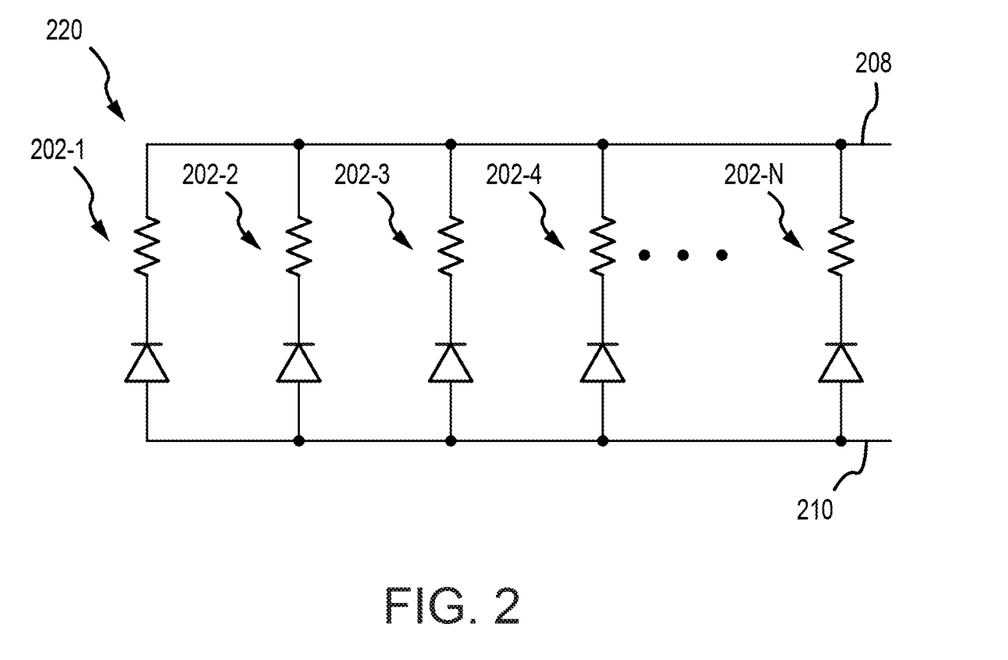
FIG. 2 is a diagram of an illustrative silicon photomultiplier in accordance with an embodiment.

Multiple SPAD devices may be grouped together to help increase dynamic range. FIG. 2 is a circuit diagram of an illustrative group 220 of SPAD devices 202. The group or array of SPAD devices may sometimes be referred to as a silicon photomultiplier (SiPM). As shown in FIG. 2, silicon photomultiplier 220 may include multiple SPAD devices that are coupled in parallel between first supply voltage terminal 208 and second supply voltage terminal 210. FIG. 2 shows N SPAD devices 202 coupled in parallel (e.g., SPAD device 202-1, SPAD device 202-2, SPAD device 202-3, SPAD device 202-4, . . . , SPAD device 202-N). More than two SPAD devices, more than ten SPAD devices, more than one hundred SPAD devices, more than one thousand SPAD devices, etc. may be included in a given silicon photomultiplier 220.

Each SPAD device 202 may sometimes be referred to herein as a SPAD pixel 202. Although not shown explicitly in FIG. 2, readout circuitry for the silicon photomultiplier 220 may measure the combined output current from all of SPAD pixels in the silicon photomultiplier. Configured in this way, the dynamic range of an imaging system including the SPAD pixels may be increased. Each SPAD pixel is not guaranteed to have an avalanche current triggered when an incident photon is received. The SPAD pixels may have an associated probability of an avalanche current being triggered when an incident photon is received. There is a first probability of an electron being created when a photon reaches the diode and then a second probability of the electron triggering an avalanche current. The total probability of a photon triggering an avalanche current may be referred to as the SPAD's photon-detection efficiency (PDE). Grouping multiple SPAD pixels together in the silicon photomultiplier therefore allows for a more accurate measurement of the incoming incident light. For example, if a single SPAD pixel has a PDE of 50% and receives one photon during a time period, there is a 50% chance the photon will not be detected. With the silicon photomultiplier 220 of FIG. 2, chances are that two of the four SPAD pixels will detect the photon, thus improving the provided image data for the time period.

The example of FIG. 2 in which the plurality of SPAD pixels 202 share a common output in silicon photomultiplier 220 is merely illustrative. In the case of an imaging system including a silicon photomultiplier having a common output for all of the SPAD pixels, the imaging system may not have any resolution in imaging a scene (e.g., the silicon photomultiplier can just detect photon flux at a single point). It may be desirable to use SPAD pixels to obtain image data across an array to allow a higher resolution reproduction of the imaged scene. In cases such as these, SPAD pixels in a single imaging system may have per-pixel readout capabilities. Alternatively, an array of silicon photomultipliers (each including more than one SPAD pixel) may be included in the imaging system. The outputs from each pixel or from each silicon photomultiplier may be used to generate image data for an imaged scene. The array may be capable of independent detection (whether using a single SPAD pixel or a plurality of SPAD pixels in a silicon photomultiplier) in a line array (e.g., an array having a single row and multiple columns or a single column and multiple rows) or an array having more than ten, more than one hundred, or more than one thousand rows and/or columns.

While there are a number of possible use cases for SPAD pixels as discussed above, the underlying technology used to detect incident light is the same. All of the aforementioned examples of devices that use SPAD pixels may collectively be referred to as SPAD-based semiconductor devices. A silicon photomultiplier with a plurality of SPAD pixels having a common output may be referred to as a SPAD-based semiconductor device. An array of SPAD pixels with per-pixel readout capabilities may be referred to as a SPAD-based semiconductor device. An array of silicon photomultipliers with per-silicon-photomultiplier readout capabilities may be referred to as a SPAD-based semiconductor device.

Figure 3:
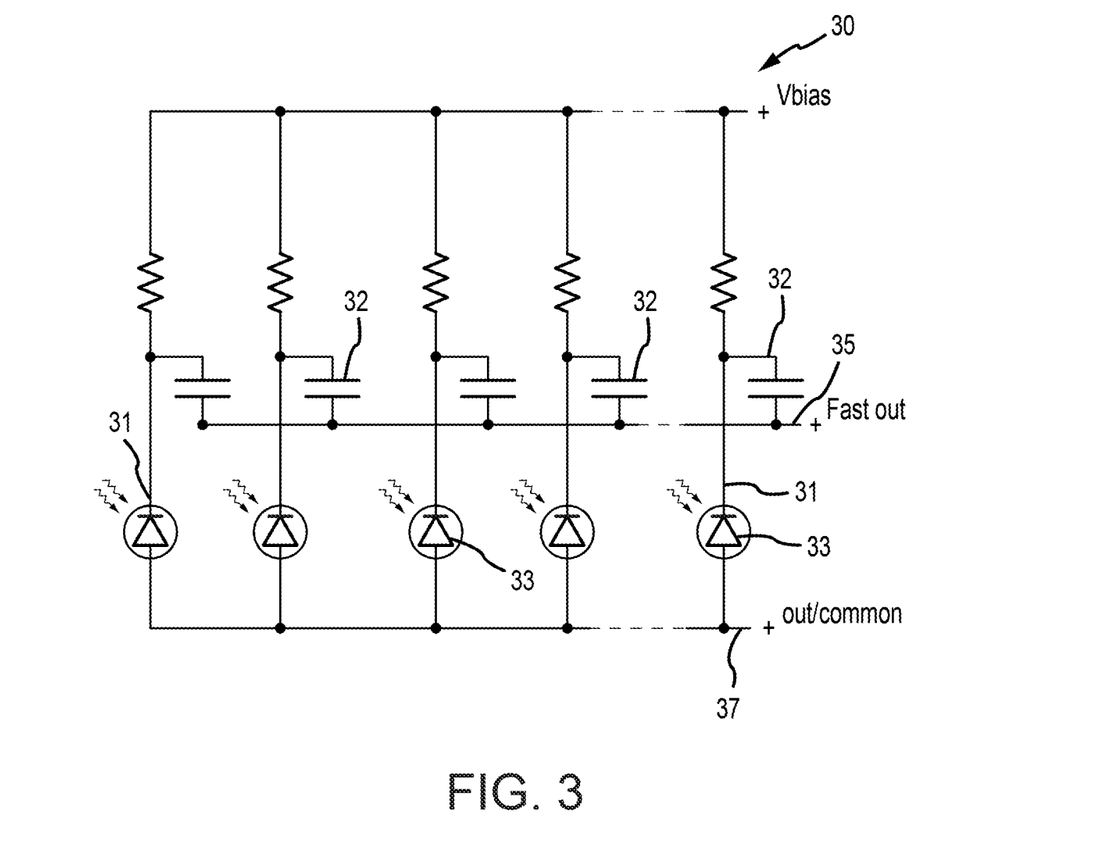
FIG. 3 is a schematic diagram of an illustrative silicon photomultiplier with a fast output terminal in accordance with an embodiment.

FIG. 3 illustrates a silicon photomultiplier 30. As shown in FIG. 3, SiPM 30 has a third terminal 35 which is capacitively coupled to each cathode terminal 31 in order to provide a fast readout of the avalanche signals from the SPADs 33. When then SPADs 33 emits a current pulse, part of the resulting change in voltage at the cathode 31 will be coupled via the mutual capacitance into the third ("fast") output terminal 35. Using the third terminal 35 for readout avoids the compromised transient performance resulting from the relatively large RC time constant associated with the biasing circuit that biases the top terminal of the quenching resistor.

Figure 4:
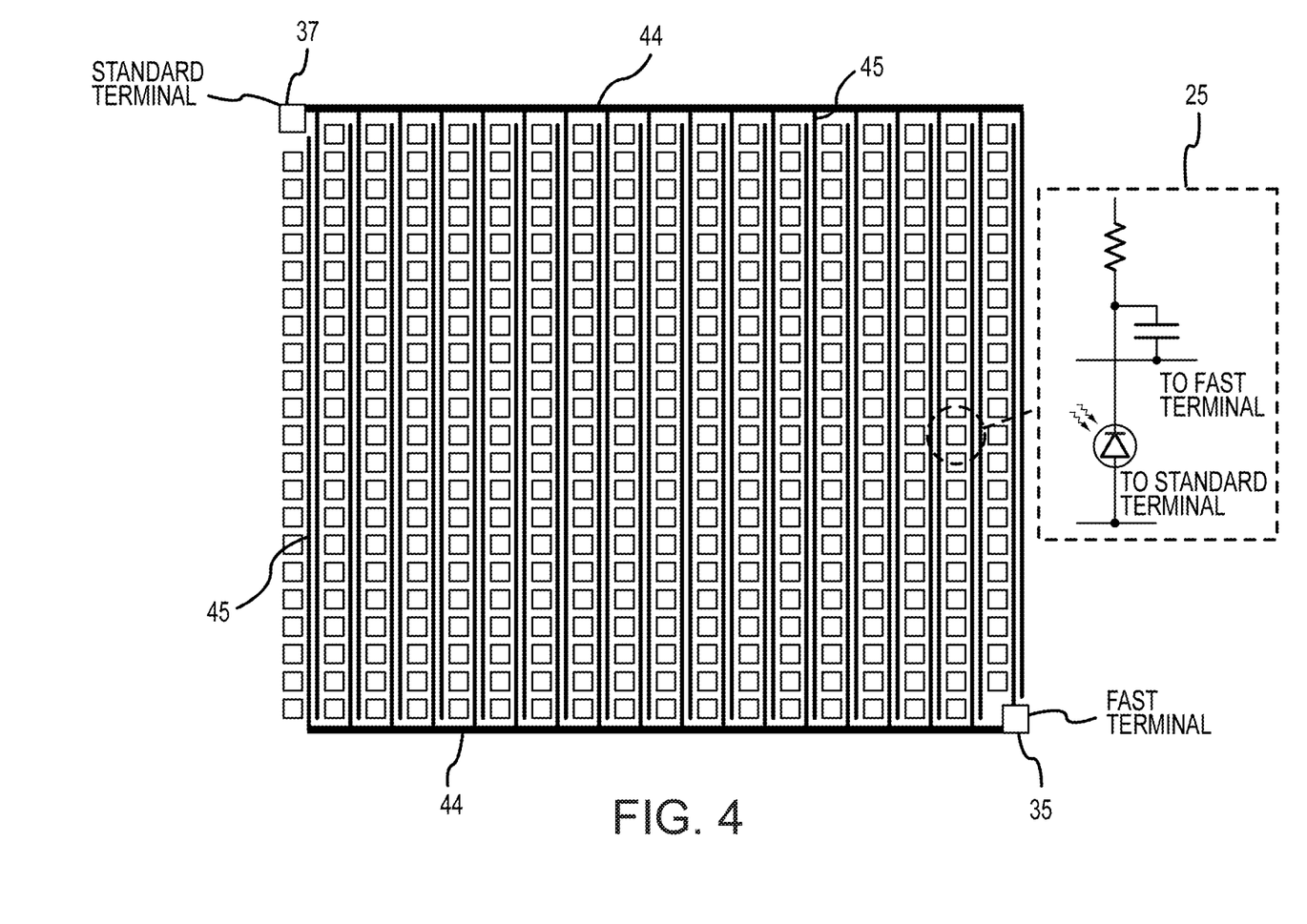
FIG. 4 is a diagram of an illustrative silicon photomultiplier comprising an array of microcells.

It will be appreciated by those skilled in the art that silicon photomultipliers include major bus lines 44 and minor bus lines 45 as illustrated in FIG. 4. The minor bus lines 45 may connect directly to each individual microcell 25. The minor bus lines 45 are then coupled to the major bus lines 44 which connect to the bond pads associated with terminals 37 and 35. Typically, the minor bus lines 45 extend vertically between the columns of microcells 25, whereas the major bus lines 44 extend horizontally adjacent the outer row of the microcells 25.

Figure 5:
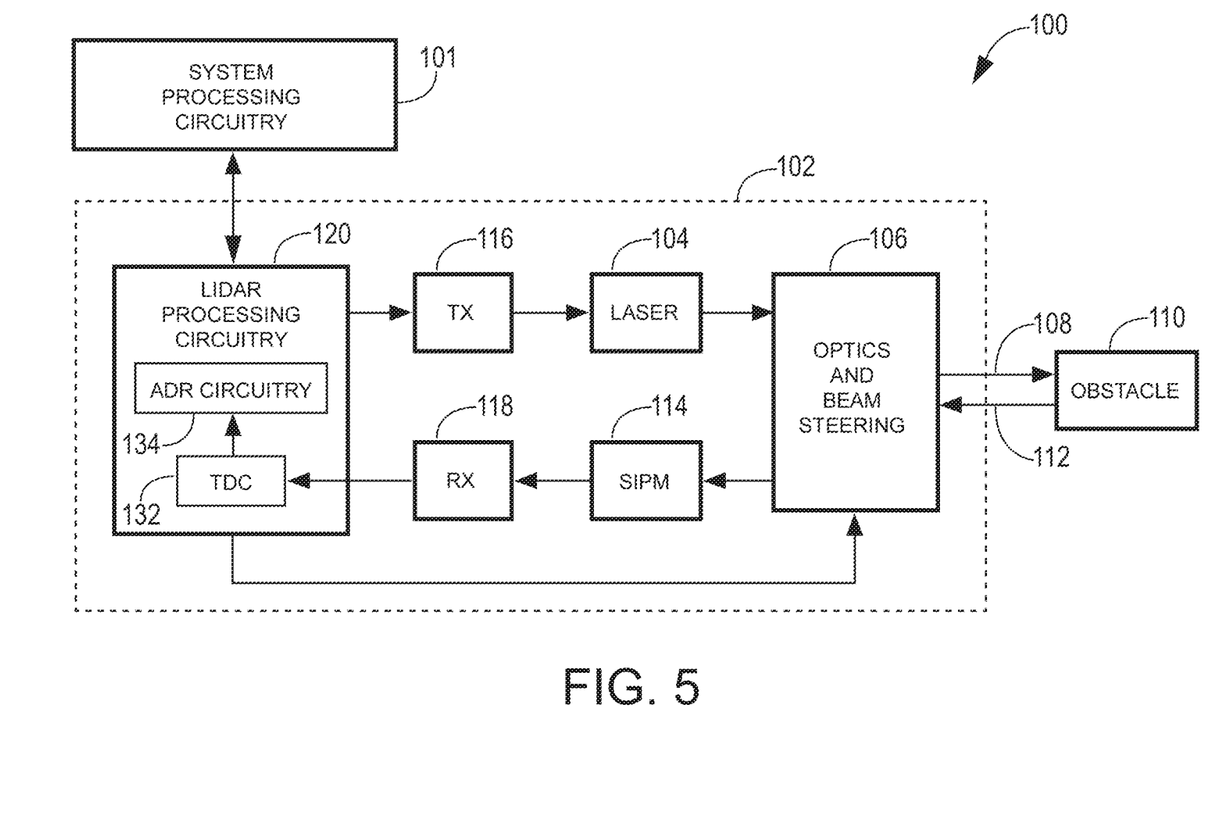
FIG. 5 is a schematic diagram of an illustrative imaging system that includes a silicon photomultiplier and LIDAR processing circuitry in accordance with an embodiment.

FIG. 5 is a schematic diagram of an illustrative system that includes a LIDAR imaging system. System 100 of FIG. 5 may be vehicle safety system (e.g., an active braking system or other vehicle safety system), a surveillance system, a medical imaging system, a general machine vision system, or any other desired type of system.

System 100 includes a LIDAR-based imaging system 102, sometimes referred to as a LIDAR module. LIDAR module 102 may be used to capture images of a scene and measure distances to obstacles in the scene.

In a vehicle safety system, information from the LIDAR module may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), a pedestrian detection system, etc. In at least some instances, a LIDAR module may form part of a semi-autonomous or autonomous self-driving vehicle.

LIDAR module 102 may include a laser 104 that emits light 108 to illuminate an obstacle 110. The laser may emit light 108 at any desired wavelength (e.g., infrared light, visible light, etc.). Optics and beam-steering equipment 106 may be used to direct the light beam from laser 104 towards obstacle 110. Light 108 may illuminate obstacle 110 and return to the LIDAR module as a reflection 112. One or more lenses in optics and beam-steering 106 may focus the reflected light 112 onto silicon photomultiplier (SiPM) 114 (sometimes referred to as SiPM sensor 114).

Silicon photomultiplier 114 is a SPAD-based semiconductor device, as described above in connection with FIGS. 1-4. In other words, silicon photomultiplier 114 may include a plurality of single-photon avalanche diodes.

The LIDAR module 102 may also include a transmitter 116 and receiver 118. LIDAR processing circuitry 120 may control transmitter 116 and laser 104. The LIDAR processing circuitry 120 may also receive data from receiver 118 (and SiPM 114). Based on the data from SiPM 114, LIDAR processing circuitry 120 may determine a distance to the obstacle 110. The LIDAR processing circuitry 120 may communicate with system processing circuitry 101. System processing circuitry 101 may take corresponding action (e.g., on a system-level) based on the information from LIDAR module 102.

LIDAR processing circuitry 120 may include time-to-digital converter (TDC) circuitry 132 and autonomous dynamic resolution circuitry 134 (sometimes referred to as signal processing circuitry 134, storage circuitry 134, dynamic resolution circuitry 134, dynamic resolution storage circuitry 134, etc.). The time-to-digital converter circuitry 132 may use time stamps to determine the length of time between the laser emitting light and the reflection being received by SiPM 114. A digital value representative of the length of time (and therefore representative of the distance to the obstacle 110) may be output by TDC 132.

The readout for direct time-of-flight (ToF) LIDAR is achieved using multiple LASER cycles to create a histogram in memory based on the time-stamps generated by a SPAD and time-to-digital converter (TDC). The peak of the histogram is used to determine the time taken for the LASER signal to travel to the target and return to the sensor.

Each time the laser emits light, a length of time between the laser emission and the reflection being sensed may be measured. The length of time may be converted to a digital value (e.g., a digital value representing the laser return time). Memory within the LIDAR processing circuitry may include a plurality of memory bins. Each bin may have an address associated with a respective length of time. The digital value representing a length of time may be used to identify a corresponding bin in the memory. A counter in that bin may subsequently be increased each time the matching return time is observed.

For example, consider first, second, and third memory bins that each have an associated length of time. As an example, the first bin may be associated with 100 picoseconds, the second bin may be associated with 200 picoseconds, and the third bin may be associated with 300 picoseconds. A first laser pulse may be measured as having a return time of 200 picoseconds. The count of the second bin is therefore increased by one after this determination. A second laser pulse may be measured has having a return time of 100 picoseconds. The count of the first bin is therefore increased by one after this determination. A third laser pulse may be measured has having a return time of 300 picoseconds. The count of the third bin is therefore increased by one after this determination. This process may be repeated for many laser pulses. The end result is the memory includes a histogram of counts for each bin (and associated length of time). The peak of the histogram (e.g., the bin having the highest count) may be used as the measure of the reflection delay (and therefore distance to the obstacle). As a simple example, after 10 laser pulses the second memory bin may ultimately have a count of 7, the first memory bin may have a count of 2, and the third memory bin may have a count of 1. The time associated with the second memory bin (200 picoseconds) is therefore taken as the return time for the laser. This return time has an associated distance to the obstacle. In this way, the peak of the histogram identifies both a return time and distance to the obstacle.

The LIDAR imaging system may have a requirement for 0.1% ranging uncertainty across the entire measurement range. For a 300 meter (m) ranging system, this means that a target at 300 m must be detected with 30 cm uncertainty. This corresponds to a TDC least significant bit (LSB) time resolution of ~2 nanoseconds (ns). However, when the target is at a closer range of 30 m, the required uncertainly becomes 3 centimeter (cm), corresponding to ~200 picoseconds LSB time resolution. Finally, a target appearing at 3 m requires 20 ps LSB resolution for 3 mm (0.1%) uncertainty.

To operate across the entire measurement range from 3 to 300 m with less than 0.1% uncertainty, a LiDAR system would thus need to designed with a 20 ps LSB time resolution (to have sufficient resolution at the low end of the range).

To have the required resolution at the low end of the sensing range (e.g., a resolution of 3 millimeters for 0.1% uncertainty at 3 meters) while still measuring at the highest end of the sensing range (300 meters), a 17-bit dynamic range TDC would be required. In other words, 300 meters/3 millimeters=100,000, and at least 17-bits are needed to reach 100,000. The number of TDC bits translates directly to histogram memory requirements.

In one example, a SPAD array may include 640×480 pixels. The memory required to build a histogram is 128 kB per pixel (assuming 8 bits per histogram bin). A column of 480 pixels would thus require 60 MB (which is undesirably high).

Targets appearing at long range do not require such high resolution. Therefore, memory may be conserved by dynamically adjusting the resolution and keeping the number of bits fixed to a lower value.

Figure 6:
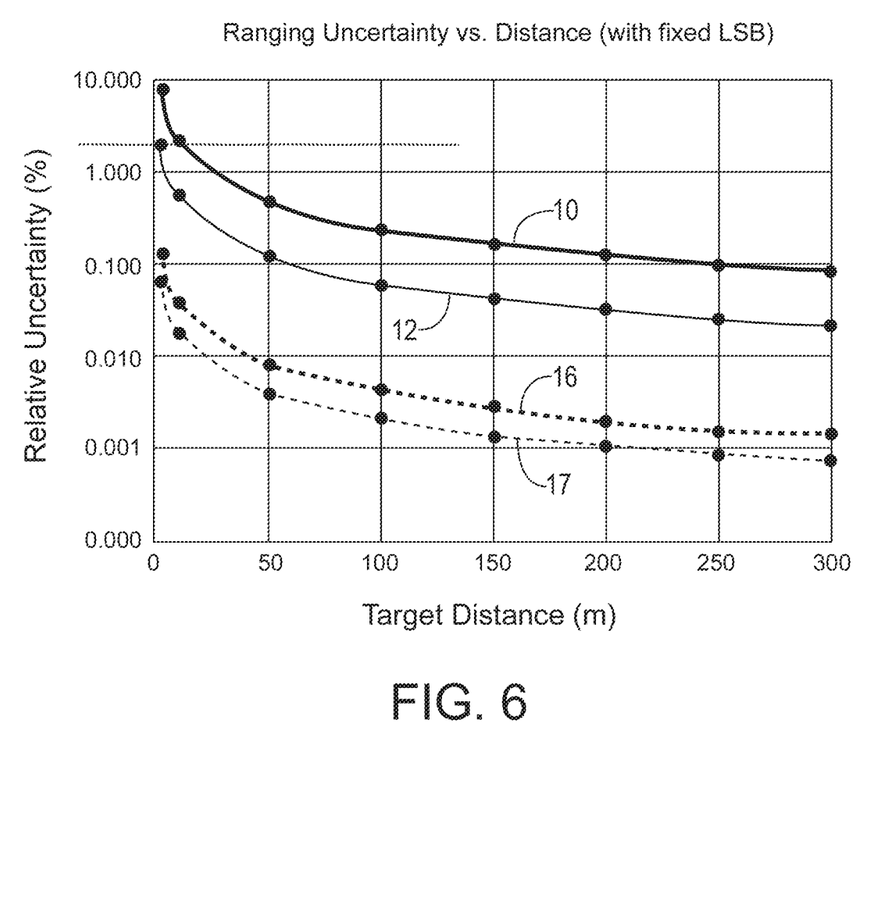
FIG. 6 is a graph of ranging uncertainty versus distance for a LIDAR system in accordance with an embodiment.

FIG. 6 is a graph showing uncertainty versus distance for various TDC bit parameters. As shown, with 17 bits, the uncertainty may be less than 0.1% across the entire range. At 16 bits, the uncertainty is less than 0.1% across most of the range. However, at low distances the uncertainty may exceed 0.1%. At 12 bits, the uncertainty may be less than 0.1% at the high end of the range (e.g., at distances greater than approximately 75 meters). However, at distances less than 75 meters, the uncertainty is greater than 0.1%. At 10 bits, the uncertainty is less than 0.1% only at the highest end of the range (e.g., about 300 meters).

To reduce the amount of memory required, a non-fixed LSB resolution scheme may be used. With a non-fixed LSB resolution, the LSB resolution may be very high at short range, but at intermediate and longer ranges, the LSB resolution becomes smaller. This allows considerable histogram memory reduction while fulfilling the requirement of 0.1% ranging uncertainty across the entire measurement range.

An autonomous dynamic resolution (ADR) scheme may be used to meet the uncertainty and ranging requirements while minimizing memory. The autonomous dynamic resolution scheme dynamically applies a data mask to selectively crop the data from the TDC output, reducing the required histogram memory size required to achieve a desired maximum ToF ranging distance with a fixed relative uncertainty.

The autonomous dynamic resolution scheme dynamically applies a data mask to the TDC to selectively crop the timestamp data, according to which sub-range the timestamp data falls in. The MSBs of the TDC output are used to encode an SRAM memory bank pointer, which is used to select the appropriate memory bank for the sub-range in which the timestamp belongs to. A bank of memory forms a histogram that has bin sizes scaled by a factor of two compared to the adjacent bank of memory. In this manner, the TDC resolution is highest for the memory bank corresponding to the shortest sub-range, and TDC resolution progressively increases by a factor of two for each subsequent memory bank corresponding to increasing sub-range distances.

The LSB resolution of the TDC may be set high enough to measure targets at a certain minimum range (3 m, for example) with high accuracy (0.1%, for example).

The TDC output data may be cropped dynamically, based on the results of the MSBs. The MSBs provide the coarse information defining the sub-range the target is in.

The histogram memory is divided into several banks, where each bank of memory holds the ToF information corresponding to different sub-ranges. The memory bins in bank 0 represent the shortest range and have the highest TDC resolution. The next memory bank corresponds to the next sub-range, corresponding to half the TDC resolution of the previous bank. The next bank corresponds to the next sub-range, with half the TDC resolution of the previous bank, and so on.

Figure 7:
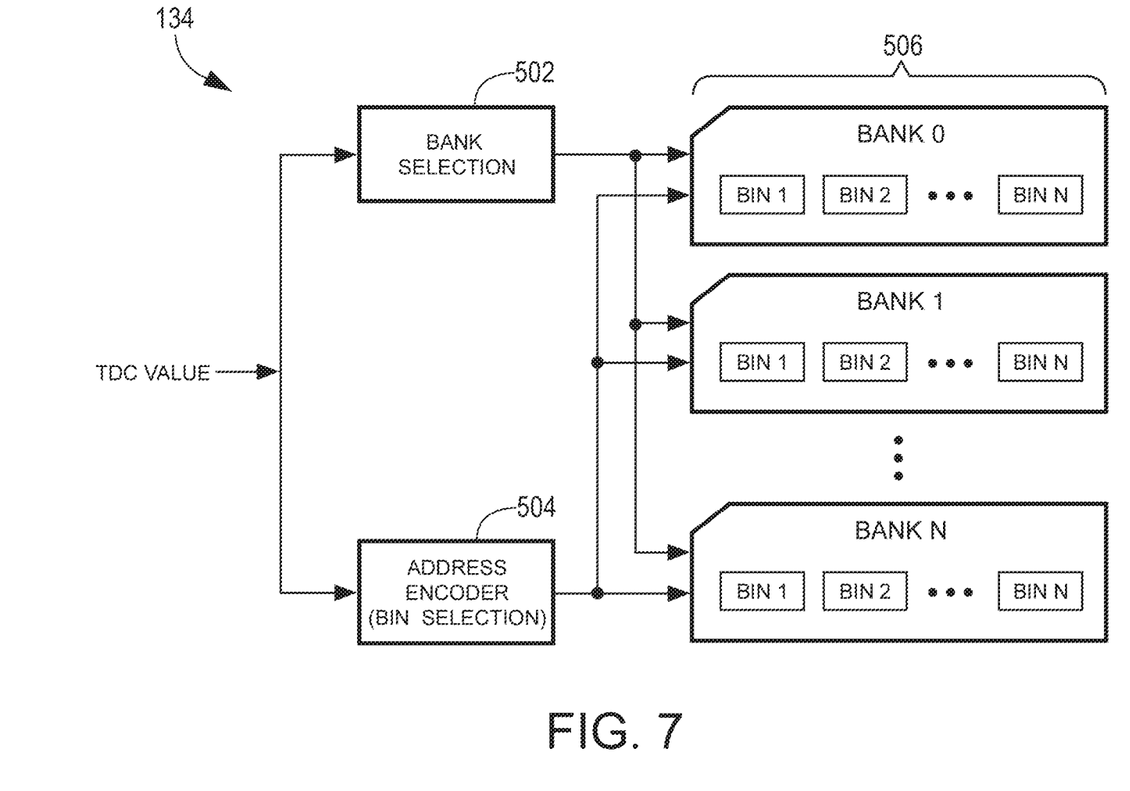
FIG. 7 is a schematic diagram of autonomous dynamic resolution (ADR) circuitry that may be included in LIDAR processing circuitry to reduce memory requirements in accordance with an embodiment.

FIG. 7 is a schematic diagram of autonomous dynamic resolution circuitry 134. As shown, the ADR circuitry 134 may receive a TDC value as an input. The TDC value may be a digital value indicative of a length of time. The TDC value may have any desired number of bits (e.g., 15 bits, 14 bits, 13 bits, 12 bits, less than 12 bits, more than 14 bits, between 6 and 20 bits, etc.).

ADR circuitry 134 includes memory banks 506. The memory banks may be random-access memory (RAM) such as static random-access memory (SRAM) or another desired type of memory. As shown, memory 506 includes a plurality of banks (sometimes referred to as pages). Each bank may include a plurality of bins. Each bin may include a plurality of bits.

To reduce the memory requirements for the system, different memory banks may have different associated resolutions. For example, bank 0 may have a least significant bit (e.g., bin 0 in the bank) associated with a first length of time. Bank 1 may have a least significant bit (LSB) (e.g., bin 0 in the bank) associated with a second length of time that is different (e.g., greater or less than) than the first length of time. Each bank may have a LSB that differs by a factor of two from the LSB of adjacent memory banks. As one illustrative example, bank 0 may have an LSB that correlates to 20 picoseconds, bank 1 may have an LSB that correlates to 40 picoseconds, bank 2 may have an LSB that correlates to 80 picoseconds, etc.

In one example, the number of bits in each bin in memory 506 may be the same (even across different banks). Considering the example above, a bank with a LSB of 20 picoseconds has a smaller total range than a bank with a higher LSB (e.g., 80 picoseconds) but a higher overall resolution. TDC values that are low may therefore be stored in a bank with a low LSB (so that uncertainty remains low even at short ranges). TDC values that are high may be stored in a bank with a high LSB (where uncertainty remains below a target threshold while simultaneously reducing memory requirements).

ADR circuitry 134 may include bank selection circuitry 502 that identifies which bank among memory banks 506 should be used. The LSB of each memory bank is known (e.g., predetermined). Bank selection circuitry 502 may select the appropriate bank for the TDC value based on the magnitude of the TDC value. For example, an input TDC value of a low magnitude (associated with 3 meters, for example) may be assigned to bank 0 (which has the lowest LSB). An input TDC value of a high magnitude (associated with 300 meters, for example) may be assigned to bank n (which has the highest LSB).

ADR circuitry 134 (sometimes referred to as dynamic resolution circuitry) also includes an address encoder 504 (sometimes referred to as address encoder circuitry 504, bin selection circuitry 504, etc.). Address encoder 504 may select a subset of bits from the input TDC value to use as a bin address. The address encoder may select the most relevant bits from the TDC input to serve as the address. In other words, the address is a truncated version of the TDC input (with some number of bits from the TDC input removed to form the address).

Figure 8:
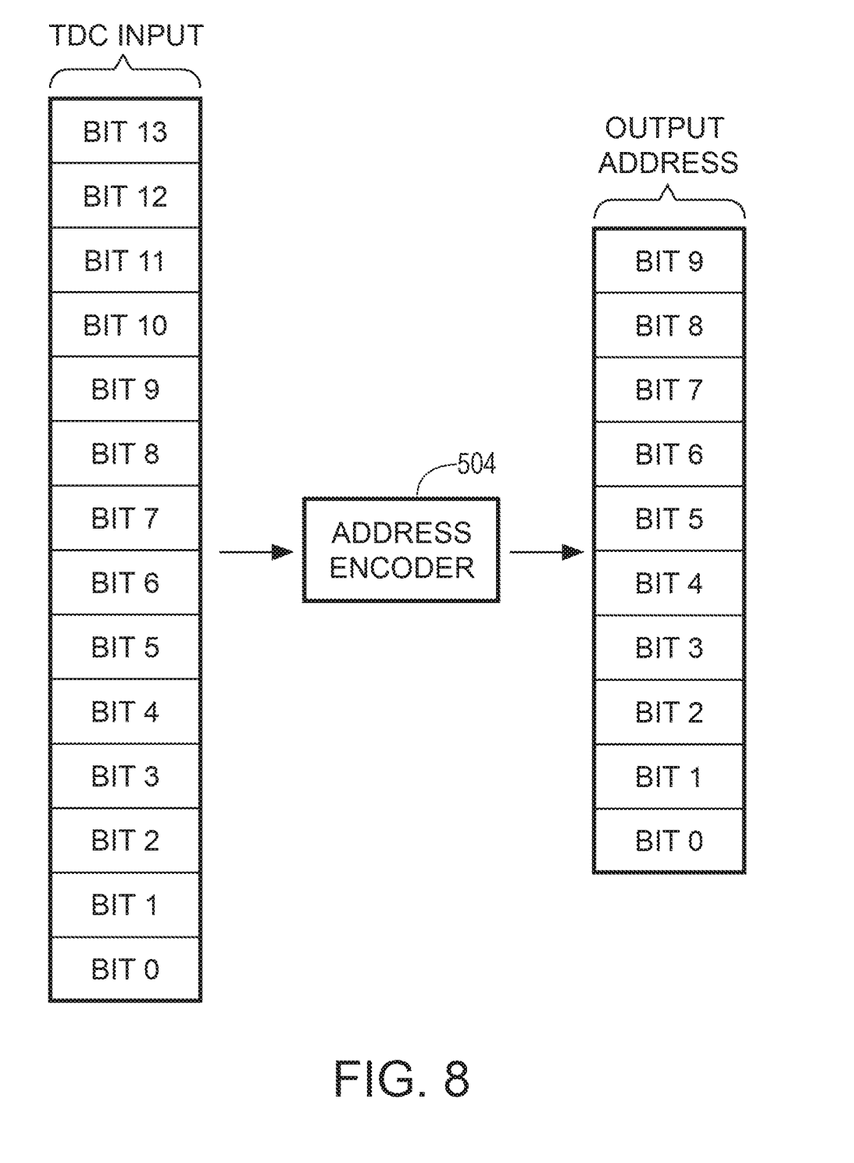
FIG. 8 is a schematic diagram showing an address encoder that may output a truncated version of a time-to-digital converter (TDC) input as an address in accordance with an embodiment.

FIG. 8 shows how address encoder 504 may output a subset of the input bits as the address. In this example, address encoder 504 receives a TDC input having 14 total bits. The output address has 10 total bits. The address encoder 504 selects which 10 bits to use as the output address based on the magnitude of the TDC input. In the example shown in FIG. 8, the 10 bits selected includes the LSB for highest resolution.

Figure 9:
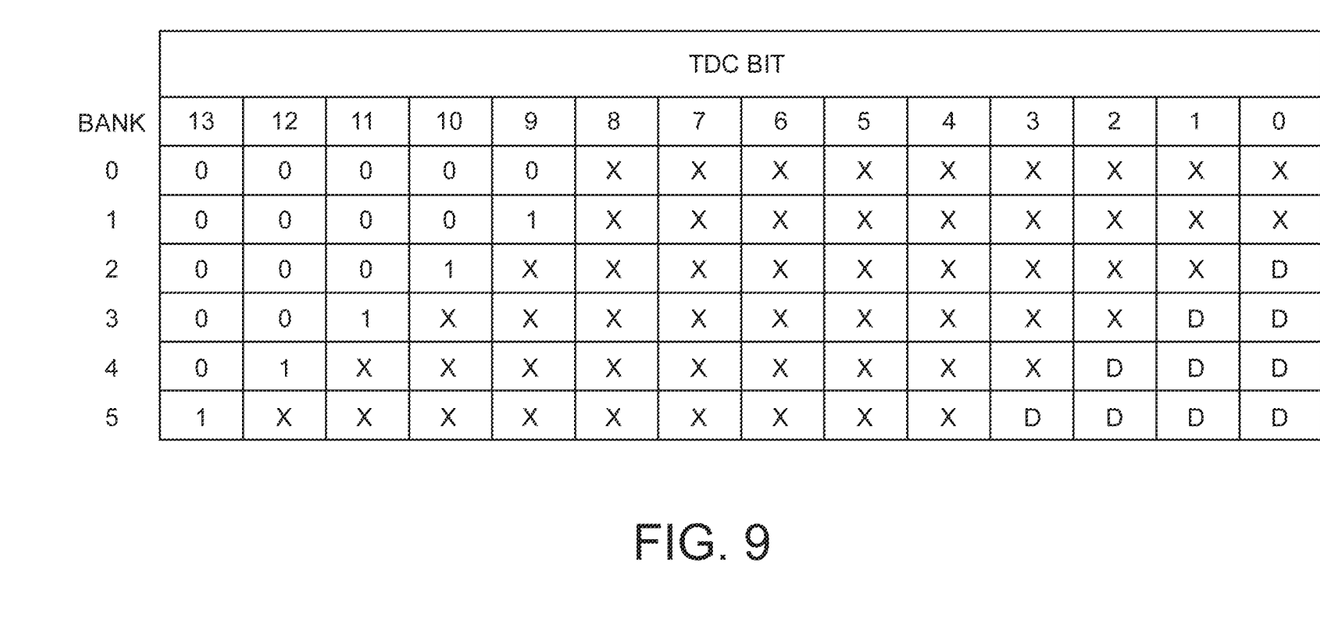
FIG. 9 is a table of illustrative TDC bits showing how the TDC input may be truncated by the address encoder in accordance with an embodiment.

FIG. 9 is a table showing how the address encoder may select bits for the output address. In the first row, bits 9-13 of the TDC input value are 0. Therefore the smallest bits (bits 0-9) may be output as the address (to bank 0). In the second row, bits 10-13 of the TDC input value are 0. Again, the smallest bits (bits 0-9) may be output as the address (to bank 1). In row 2, bit 10 is 1 and bits 11-13 are 0. Therefore, the 0 bit of the TDC input may be discarded (as indicated by the 'D') and bits 1-10 may be output as the address (to bank 2). In row 3, bit 11 is 1 and bits 12-13 are 0. Therefore, the 0 and 1 bits of the TDC input may be discarded and bits 2-11 may be output as the address (to bank 3). In row 4, bit 12 is 1 and bit 13 is 0. Therefore, the 0, 1, and 2 bits of the TDC input may be discarded and bits 3-12 may be output as the address (to bank 4). In row 5, bit 13 is 1. Therefore, the 0, 1, 2, and 3 bits of the TDC input may be discarded and bits 4-13 may be output as the address (to bank 5). Note, the resolution of each bank is flexible. In this particular example, the first 2 banks both have the same resolution (LSB=Bit 0) to give highest resolution over an extended range.

The output address may identify the address of a bin in memory 506. The banks may all have the same number of bins. Therefore, the output address from encoder 504 merely identifies a bin number (that can be applied to any of the banks, as identified by bank selection circuitry 502). The identified bin number has a counter that is increased by 1 when selected by address encoder 504. This process may be repeated for many input TDC values to build the aforementioned histogram.

Figure 10:
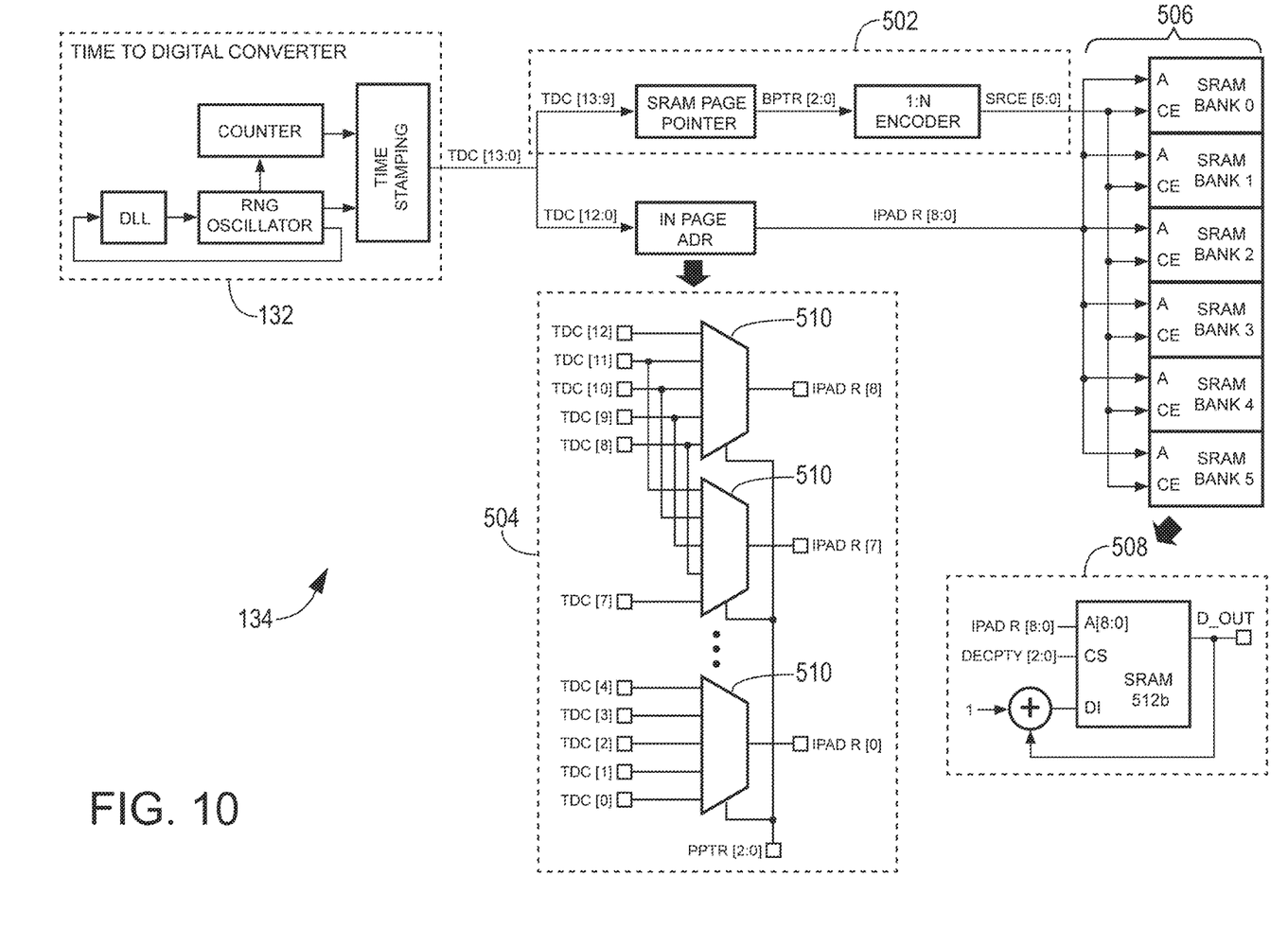
FIG. 10 is a schematic diagram of illustrative LIDAR processing circuitry including a time-to-digital converter (TDC) and autonomous dynamic resolution (ADR) circuitry in accordance with an embodiment.

FIG. 10 is a schematic diagram of LIDAR processing circuitry including time-to-digital converter (TDC) circuitry 132 and autonomous dynamic resolution circuitry 134. As shown, the output from TDC 132 is provided to both bank selection circuitry 502 and address encoder 504. Bank selection circuitry 502 selects an appropriate bank out of memory 506 based on the TDC input. Address encoder 504 outputs a subset of the bits in the TDC input as an address. The address output by address encoder 504 identifies a respective bin. After a bin is selected by the address from encoder 504, the counter for that bin is updated. Inset portion 508 in FIG. 10 shows an example of a counter that may be used to increase the counts in memory 506.

Address encoder 504 includes a plurality of multiplexers 510. In FIG. 10, each multiplexer has five inputs and one corresponding output. The multiplexer outputs a selected one of the five inputs based on the magnitude of the TDC input. For example, if the TDC input is low the multiplexers may output bits 0-9 (as indicated in FIG. 9). If the TDC input is high the multiplexers may output bits 4-13 and discard bits 0-3 (as indicated in FIG. 9).

Said another way, the TDC input may be categorized in a given sub-range. The multiplexer inputs may also each have a corresponding sub-range. For example, the first input to each multiplexer is associated with the first sub-range, the second input to each multiplexer is associated with the second sub-range, the third input to each multiplexer is associated with the third sub-range, etc. If the TDC input is in the first sub-range, each multiplexer may output its first input (associated with the first sub-range) as an output. If the TDC input is in the second sub-range, each multiplexer may output its second input (associated with the second sub-range) as an output, etc.

It should be noted that the resolution (e.g., the time and therefore distance associated with the LSB) and size (e.g., the number of bins) of each bank is flexible. The resolution of each consecutive bank does not have to be less than the previous bank and the size of each bank does not have to be the same.

In one example, memory 506 includes six banks each having 512 bins. This example is merely illustrative and in general memory 506 may include any number of banks and any number of bins per bank. Each bin may include any desired number of bits.

Address encoder 504 may remove any desired number of bits from the TDC input when outputting the address. For example, the output address may be smaller than the TDC input by 1 bit, 2 bits, 3 bits, 4 bits (as in FIG. 8), 5 bits, 6 bits, 7 bits, more than 7 bits, between (and including) 3 bits and 6 bits, etc.

ADR (as in FIGS. 5-10) improves the maximum ranging distance for a fixed memory size. For fixed memory of 24 kbit/pixel, ADR has 6× ranging improvement compared to fixed resolution.

Some key benefits of this autonomous dynamic resolution scheme are that no information is lost. Linear 'full' histogramming is used, with dynamic resolution to attain constant uncertainty across entire measurement range. There are no border condition issues. The memory requirements may be greatly reduced using the ADR scheme (compared to a fixed-LSB scheme). The frame rate is not lowered by bin iterations. The readout scheme may also be applied to any desired ranging distances. In other words, the design is flexible and may be applied to LIDAR systems regardless of the particular range of interest.

The autonomous dynamic resolution scheme enables high-resolution SPAD arrays for LIDAR imaging systems. Memory compression helps to reduce die size. Memory compression allows more pixels to be used in a LiDAR system where memory resources are limited and fixed. Memory compression directly impacts die area, yield and test requirements, which results in lower manufacturing cost. TDC runs on a fixed frequency without a need of control (multiplexing) clock frequency. It is easy for implementation and reuse even for different TDC resolution.

The foregoing is merely illustrative of the principles of this invention and various modifications can be made by those skilled in the art. The foregoing embodiments may be implemented individually or in any combination.

What is claimed is:

1. A system, comprising:
   a semiconductor device that includes a single-photon avalanche diode; and
   processing circuitry configured to receive an output signal from the semiconductor device, wherein the processing circuitry comprises:
   a time-to-digital converter configured to, based on the output signal from the semiconductor device, output a value that represents a length of time; and
   dynamic resolution storage circuitry that receives the value, wherein the dynamic resolution storage circuitry includes a first memory bank with an associated first resolution and a second memory bank with an associated second resolution that is different than the first resolution, wherein a least significant bit for the first memory bank is associated with a first length of time, and wherein a least significant bit for the second memory bank is associated with a second length of time that is different than the first length of time.

2. The system defined in claim 1, wherein the second resolution differs from the first resolution by a factor of two.

3. The system defined in claim 1, wherein the first memory bank includes a first plurality of bins, wherein each one of the first plurality of bins comprises a respective first plurality of bits, wherein the second memory bank includes a second plurality of bins, and wherein each one of the second plurality of bins comprises a respective second plurality of bits.

4. The system defined in claim 3, wherein a number of bins in the first plurality of bins is the same as in the second plurality of bins.

5. The system defined in claim 3, wherein a number of bits in the first plurality of bits is the same as in the second plurality of bits.

6. The system defined in claim 1, wherein the second length of time differs from the first length of time by a factor of two.

7. The system defined in claim 1, wherein the first and second memory banks are part of a plurality of memory banks and wherein the dynamic resolution storage circuitry includes bank selection circuitry that is configured to select one of the plurality of memory banks based on the value from the time-to-digital converter.

8. The system defined in claim 7, wherein the dynamic resolution storage circuitry includes an address encoder that is configured to output an address based on the value from the time-to-digital converter.

9. The system defined in claim 8, wherein the address is a truncated version of the value that includes fewer bits than the value.

10. The system defined in claim 8, wherein the address encoder includes a plurality of multiplexers that each has a plurality of inputs and wherein each multiplexer is configured to output a selected one of the plurality of inputs.

11. The system defined in claim 1, further comprising:
a laser configured to emit light, wherein the value that represents the length of time represents a return time associated with the light emitted by the laser.

12. A system, comprising:
a semiconductor device that includes a single-photon avalanche diode; and
processing circuitry configured to receive an output signal from the semiconductor device, wherein the processing circuitry comprises:
a time-to-digital converter configured to, based on the output signal from the semiconductor device, output a value that represents a length of time;
a plurality of memory banks, wherein each memory bank includes a plurality of bins;
bank selection circuitry that is configured to select one of the plurality of memory banks based on the value; and
an address encoder that is configured to output an address for one of the plurality of bins based on the value.

13. The system defined in claim 12, wherein each memory bank has a respective least significant bit magnitude and wherein the least significant bit magnitudes of at least two different memory banks are different.

14. The system defined in claim 12, wherein the address encoder comprises a plurality of multiplexers, wherein each multiplexer has a plurality of inputs that each receive a respective bit of the value, and wherein each multiplexer is configured to output a selected one of the plurality of inputs.

15. The system defined in claim 12, wherein the address is a truncated version of the value that includes fewer bits than the value.

16. The system defined in claim 12, wherein different memory banks of the plurality of memory banks have different resolutions.

17. A system, comprising:
a silicon photomultiplier; and
processing circuitry configured to receive an output signal from the silicon photomultiplier, wherein the processing circuitry comprises:
a time-to-digital converter configured to, based on the output signal from the silicon photomultiplier, output a value that represents a length of time, wherein the value comprises a first number of bits;
an address encoder configured to receive the value and output a truncated version of the value that includes a second number of bits, wherein the second number is less than the first number; and
a plurality of memory bins, wherein the truncated version of the value identifies a memory bin of the plurality of memory bins.

18. The system defined in claim 17, wherein the memory bin identified by the truncated version of the value has a counter that is increased by one when identified by the truncated version of the value.

19. The system defined in claim 17, wherein outputting the truncated version of the value comprises discarding one or more bits from the value based on a bit number of a largest bit in the value that is equal to 1.

20. The system defined in claim 12, wherein the bank selection circuitry is configured to select the one of the plurality of memory banks based on a magnitude of the value.

* * * * *